Patented Aug. 10, 1948

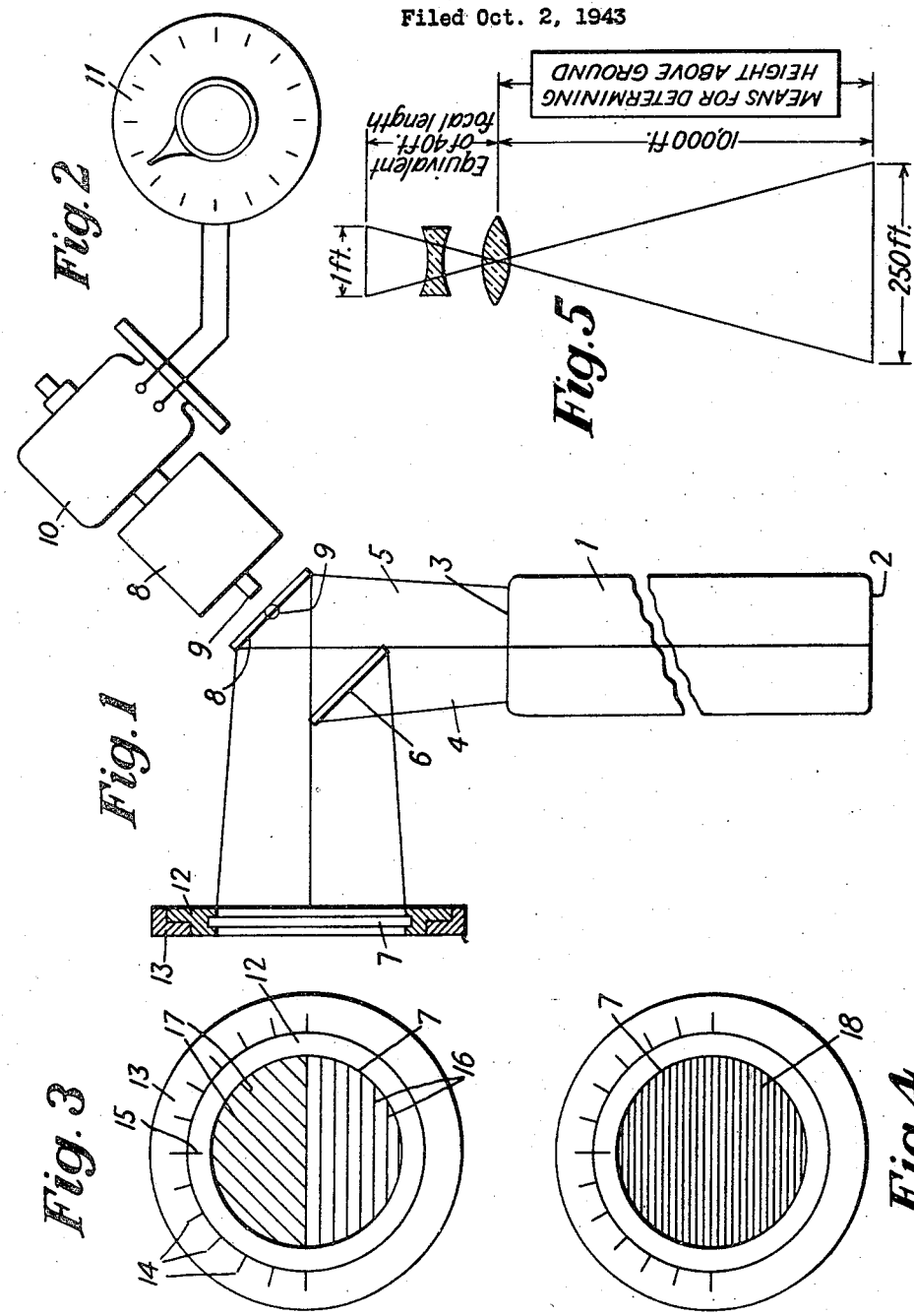

2,446,845

UNITED STATES PATENT OFFICE 2,446,845

ABSOLUTE AIRCRAFT SPEEDOMETER

Montford Morrison, Upper Montclair, N. J.

Application October 2, 1943, Serial No. 504,673

6 Claims. (Cl. 88—1)

The present invention relates to instruments for determining the speeds of aircraft in flight and relates in particular to such instruments used to determine the absolute speed of the aircraft with respect to ground, from ground observations directly.

Among the objects of the invention are; to provide an improved means for measuring the speed of aircraft by measuring the absolute relative speed between the aircraft and ground; to provide an aircraft speedometer, the readings of which are independent of air-currents and to provide such an instrument with a high order of accuracy.

In the present invention, the speeds over ground are determined by the utilization of means for reducing these speeds to apparent values which are easily measured over short distances in very small spaces.

A method of reducing the actual speed over ground to an apparent easily measurable value is, in a preferred form, by an optical system which produces in the aircraft a reduced image of the ground view in motion and various means may be applied to this reduced ground view to measure its apparent speed across the field of view, and by taking into account the height of the speedometer above ground and the said apparent speed, the actual speed over ground may be determined. The term "ground," as used in this specification and in the claims hereunder, is used to mean any object capable of optical observation and which object has no substantial motion with reference to the earth, which includes waves of the sea, trees, buildings and other such points of reference, as will be understood by those skilled in the art to which the invention appertains.

Further and other objects will be pointed out and obvious upon reading the description hereunder, in connection with the drawings of which Fig. 1 is a diagrammatic illustration of an optical system employed in an embodiment of the present invention; Fig. 2 is an elevation of a part of Fig. 1 considered as a plan view; Fig. 3 is an elevation of Fig. 1 considered as a plan view; Fig. 4 is a supplementary substitute elevation for Fig. 3, and Fig. 5 is a geometrical illustration of a part of the optical system employed.

In Fig. 1, I is the barrel of a telescopic camera lens system, having the objective lens located at 2 and suitably mounted in an aircraft in gimbal-bearings with or without a gyroscope to maintain the system I with its optical axis preferably in a vertical line with the tangent to the surface of the earth.

The telescopic lens system I provides a projected image of the ground view through the so-called eye-piece end 3. The field of view emerging from eye-piece 3 is divided in two semi-cones 4 and 5. The semi-cone of light 4 falls upon the stationary mirror 6 and is reflected upon a translucent screen 7 shown in edgewise elevation in Fig. 1.

The cone of light 5 is projected against the mirror 8 which may revolve about an axis 9 and projects the cone of light 5 against the upper half of screen 7.

Referring to Fig. 2, 8 and 9 are respectively the mirror and axis described in Fig. 1, and which mirror is rotated by a mechanical means 10, the speed of rotation of which is accurately determined by indicator 11. In the present embodiment, 10 is illustrated as an electric motor and may be of the construction described in the applicant's co-pending application Serial No. 496,389, filed July 28, 1943, now Patent 2,415,022 granted January 28, 1947, in which application is described an electric motor device capable of having its speed varied to different fixed values which are within .01% of the indicated value and which indicated value is maintained at this accuracy during operation. However, any suitable revolving device, the speed of which may be accurately measured, is suited to this embodiment of the invention.

In Fig. 1, the translucent screen 7 is mounted in a holder 12 which may be turned in a bearing 13.

Fig. 3 is an end view of Fig. 1, facing east. The bearing 13 is provided with calibration marks such as those indicated by 14, and the holder 12 is provided with the calibration mark 15.

A simplified diagrammatic representation of the optical system which may be contained in barrel I of Fig. 1, is shown in Fig. 5.

The purpose of this optical system is to cast an image in motion of the ground view on a screen in the aircraft and an illustrative example will be given of its use.

The optical system comprises of essentially a very long focal length lens system and since a focal length of the order of 40 feet may be desirable, a compound lens system is utilized to shorten the actual physical length of the barrel containing the optical system to a small fraction of the 40 feet.

For purposes of illustration, in Fig. 5 is shown one of the common optical methods of accomplishing this shortened-optical-system barrel-length and will be recognized by those skilled in the art as related to the lens system commonly found in opera glasses, which permits the lens barrel 1, to be shortened to a length convenient for aircraft use.

Taking an illustrative example of an aircraft traveling at 160 M. P. H. which corresponds to an approximate ground speed of 250 feet per second, the telescopic optical system, in this case for purposes of illustration, has an aperture, which, at an object distance of 10,000 feet, corresponds to that which covers a 250-foot field, as illustrated in Fig. 5.

With the equivalent of a 40-foot focal length, the 250-foot objective aperture field can be brought into focus in the aircraft in a one foot circular viewing field, as illustrated in the figure.

It will be appreciated by those skilled in the art, that the time required for an object on the ground to pass across the 250-foot field located thereon will be the same as that required to pass across the 1-foot field on the aircraft screen viewing field. If the speed is such that the 250-foot distance is passed over in one second, then the speed across the screen in the aircraft is one foot per second.

It will be appreciated that the speeds in the aircraft viewing field may be, by suitable optical design, fixed at such speeds as are best suited to the methods employed in measuring them.

For example, speeds of a few inches per second may be measured by a stop watch or more accurately on a chronograph, if desired. However, speeds above probably one foot per second, move across the screen too rapidly to be accurately followed by any manually adjusted device guided by ocular observation. These higher speeds appear as streaks or lines upon the screen, such as illustrated in the lower semi-circle of translucent screen 7, Fig. 3, by lines identified by the numeral 16. These are not specifically lines but appear as lines due to the persistence of vision.

If the rotating mirror 8 of Figs. 1 and 2 be set into motion by means of motor device 10 and its speed be slowly increased by regulating device 11, the lines cast on the upper semi-circle of the screen 7, instead of being parallel to lines 16 as would be the case with the mirror 8 stationary, would assume an angular position such as illustrated by the numeral 17 in Fig. 3. The angles that lines 17 form with lines 16, will depend upon the speed of the revolving mirror 8. These apparent lines are formed by differences of density in the ground field and may be regarded, for purposes of illustration, as spots moving across the field and the revolution of the mirror 8 causes the lines 17 to assume the vector direction resulting from the scalar speed of the ground field operated upon by the vector effect of the revolving mirror 8.

Fig. 4 is a duplicate of Fig. 3 except that the translucent screen 7 is provided with an optical grating 18, which is useful in determining the vector directions of lines 16 and 17. In other words, if the grating 18 is superimposed upon the lines 16 and 17, coincidence between the lines 16 and 17 more accurately determines the vector angles, as will be more fully understood hereunder.

The entire optical system is mounted in an integral structure which is oriented in the aircraft so that the viewing screen 7 has projected upon it an image of the field of ground vertically under telescope 1, which is maintained in a vertical position by the gimbal bearings above referred to. The lines 16 are thus caused to represent the direction of flight parallel to the surface of the ground directly under the telescope.

In the use of the embodiment herein described to determine the speed over ground of an aircraft, the following procedure may be followed:

The first case taken will be that comprising a set of conditions in which the speed of the objects across the field of view on the translucent screen 7 are sufficiently rapid to appear as lines thereon instead of moving objects.

The grating 18 of Fig. 4 is superimposed upon the translucent screen 7 of Fig. 3, the grating 18 being fixed to the holder 12, rotating therewith. For clearness, the grating 18 is shown in a separate figure from that of Fig. 3 because of the difficulty in distinguishing between the grating lines 18 and the motional lines 16 of Fig. 3. However, in operation, the grating lines 18 are included in the line of vision of Fig. 1 and the holder 12, Figs. 1 and 3, is rotated until the grating lines 18 are parallel with the motional lines 16 and the reading on the calibrations 14, with reference to line 15, is recorded.

This procedure determines the vector direction of the flight of the aircraft with a high degree of accuracy.

The revolving mirror 8 is set into revolution and its speed accurately noted on regulator 11, and as the lines 17, Fig. 3, begin to assume an angle with lines 16 the grating 18 is revolved to determine accurately that angle by calibrations 14 and mark 15 as before.

While any suitable angular velocity of mirror 8 may be used and a speed value determined from the angle made by the lines 17, it will be found more accurate and more convenient to have the angle between the lines 17 and 16 45° for all ground speeds and obtain this said 45° angle by adjustment of regulator 11 to a suitable speed of mirror 8 to produce the desired angle.

The 45° angle is produced, of course, when the rotation of mirror 8 causes the spots reflected by said mirror to traverse the field of the translucent screen 7 in a direction at right angles to lines 16, at a speed equal to the speed of the spots in the direction of the lines 16, the lines 17 being the vector sum of the speed of the spots in the direction of lines 16 and the speed of the spots at a right-angle thereto.

The other factor involved in applying this invention to the measurement of the speed of aircraft over ground is the height of the aircraft above ground and some suitable means has to be employed to determine this height accurately and it is indicated as a means factor in Fig. 5. The exact method employed in determining the height to be used in connection with these speed determinations is not of importance so long as the height measurement obtained by the method employed, is of the accuracy required for the overall result desired by the application of the invention.

In the case of a moving field of view across screen 7 in which the speed of the objects in the field of view is sufficiently low that lines are not formed but the objects move with sufficient rapidity in order to align them with the grating 18, the above described procedure may be also followed in such a case. That is, the objects across the field do not have to appear as streaks if the grating 18 is used to determine their vector direction which is the requirement of the structure described.

For very slow speeds across the translucent screen 7, the revolving mirror 8 need not to be brought into use, but the direct transit time of an object across a given length of the translucent screen 7 may be measured by any applicable method including any of the well known chronometric devices and/or modifications thereof.

Inductive and deductive proofs of the geometry and trigonometry of the operational characteristics have been omitted as it is believed that they are fully understood by those skilled in the art to which the invention appertains.

In the foregoing description, precise details and engineering refinements have been avoided for clearness in teaching the application of this invention and the scope thereof is set forth in the claims hereunder.

What I claim is:

1. In a device for determining the relative speed between an aircraft in flight and ground, the combination, a viewing screen in said aircraft, a telescope mounted upon said aircraft continuously projecting a moving image of the field of ground vertically under said telescope from the eyepiece thereof, means reflecting a part of said image on said viewing screen, means rotatably mounting said screen provided with indicia to determine the direction of motion of said moving image part respect to said aircraft, a rotating image reflector intercepting a part of said moving image and causing the intercepted part of the moving image to have a motional direction upon said screen at an angle with the direction of movement of said first moving image part, and means to determine said angle.

2. In a device for determining the relative speed between an aircraft in flight and ground, the combination, a viewing screen in said aircraft, a telescope mounted upon said aircraft continuously projecting a moving image of the field of ground vertically under said telescope from the eyepiece thereof, means reflecting a part of said image on said viewing screen, said screen being in position with reference to said telescope to visibilize a horizontal plane of said field, means rotatably mounting said screen provided with indicia to determine the directions of movement of said first moving image part with respect to said aircraft, a rotating image reflector intercepting a part of said moving image and reflecting the intercepted part of the moving image to cause a motional direction thereof upon said screen at an angle with the direction of movement of reflection of said first moving image part, the relative direction of movement of said intercepted image part reflection being a result of the rotation of said reflector, and means to determine the speed of said rotation.

3. In a device for determining the relative speed between an aircraft in flight and ground, the combination, a viewing screen in said aircraft, a telescope mounted upon said aircraft continuously projecting a moving image of the field of ground vertically under said telescope from the eyepiece thereof, means reflecting a part of said image on said viewing screen, said screen being in position with reference to said telescope to visibilize a horizontal plane of said field, means rotatably mounting said screen provided with indicia to determine the direction of motion of said moving image part with respect to said aircraft, a rotating image reflector intercepting a part of said moving image and reflecting the intercepted part of the moving image to cause a motional direction thereof upon said screen at an angle with the direction of movement of reflection of said first moving image part, the relative direction of movement of said intercepted image part reflection being a result of the rotation of said reflector, means to determine said angle, and means to determine the speed of said rotation.

4. In a device for determining the relative speed between an aircraft in flight and ground, the combination, a viewing screen in said aircraft, means including a telescope mounted upon said aircraft continuously projecting a moving image of the field of ground vertically under said telescope from the eyepiece thereof and directing a part of said image upon said viewing screen, said screen being in position with reference to said telescope to visibilize a horizontal plane of said field, said screen provided with indicia to determine the direction of travel of said part of said moving image with respect to said aircraft, a rotating image reflector intercepting a part of said moving image and reflecting the intercepted part of the moving image to cause an additional motion thereof upon said screen at an angle to the direction of motion of first said moving image part thereon, said additional motion being composited with the motion of first said image part resulting in a third motional direction, said third direction being a result of the rotation of said reflector, means to fix the speed of rotation of said reflector to cause said third direction to make a fixed angle with the direction of motion of first said image part for a ground speed, and means to determine the speed of said rotation.

5. In a device for determining the relative speed between an aircraft in flight and ground, the combination, a viewing screen in said aircraft, means including a telescope mounted upon said aircraft continuously projecting a moving image of the field of ground vertically under said telescope from the eyepiece thereof and directing a part of said image upon said viewing screen, said screen being in position with reference to said telescope to visibilize a horizontal plane of said field, said screen provided with indicia to determine the direction of travel of said part of said moving image with respect to said aircraft, a rotating image reflector intercepting a part of said moving image and reflecting the intercepted part of the moving image to cause an additional motion thereof upon said screen at a right-angle to the direction of motion of first said moving part thereon, said additional motion being composited with the motion of first said image part resulting in a third motional direction, said third direction being a result of the rotation of said reflector, means to fix the speed of rotation of said reflector to cause said third direction to make a forty-five degree angle with the direction of motion of first said image part for a range of ground speeds, and means to determine the speed of said rotation.

6. The method of determining the speed of aircraft over ground employing two images on a viewing screen in the aircraft of the ground vertically under the aircraft with the images moving in directions having a fixed angular relation, comprising creating an image in the aircraft of a part of the ground-field directly thereunder with the image-part having the motion of a predetermined fractional speed of the actual relative speed to be determined, imparting to an image of a second part of said ground-field an additional motion to provide a predetermined angle between the directions of motions of the two said image parts, determining the relative speed of said additional motion required to produce said angle, and employing this relative speed in combination with the altitude of the aircraft to determine the speed thereof over ground.

MONTFORD MORRISON.

REFERENCES CITED

The following references are of record in the file of this patent:

UNITED STATES PATENTS

| Number | Name | Date |
|---|---|---|
| 1,084,831 | Vaniman | Jan. 20, 1914 |
| 1,121,309 | Thompson | Dec. 15, 1914 |
| 1,711,318 | Jenkins | Apr. 30, 1929 |
| 1,773,309 | Hugershoff | Aug. 19, 1930 |